US007846630B2

(12) United States Patent
Murakami et al.

(10) Patent No.: US 7,846,630 B2
(45) Date of Patent: Dec. 7, 2010

(54) BINDER RESIN FOR TONER, TONER, AND METHOD OF MANUFACTURING BINDER RESIN FOR TONER

(75) Inventors: Shuichi Murakami, Ichihara (JP); Yoshihito Hirota, Saijo (JP); Masaaki Shin, Souka (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 676 days.

(21) Appl. No.: 11/919,502

(22) PCT Filed: Jun. 16, 2006

(86) PCT No.: PCT/JP2006/312104

§ 371 (c)(1), (2), (4) Date: Oct. 29, 2007

(87) PCT Pub. No.: WO2006/135041

PCT Pub. Date: Dec. 21, 2006

(65) Prior Publication Data

US 2009/0068578 A1 Mar. 12, 2009

(30) Foreign Application Priority Data

Jun. 17, 2005 (JP) ............................ 2005-177685

(51) Int. Cl.
*G03G 9/087* (2006.01)
*C08F 8/00* (2006.01)

(52) U.S. Cl. .......................... 430/105; 525/50; 525/419

(58) Field of Classification Search .................. 430/105

See application file for complete search history.

(56) References Cited

U.S. PATENT DOCUMENTS

2004/0132929 A1 7/2004 Martin et al.

FOREIGN PATENT DOCUMENTS

| | | | |
|---|---|---|---|
| JP | 62-062369 | A | 3/1987 |
| JP | 64-035456 | A | 2/1989 |
| JP | 03-006572 | A | 1/1991 |
| JP | 04-026858 | A | 1/1992 |
| JP | 09-292736 | A | 11/1997 |
| JP | 2001-222138 | A | 8/2001 |
| JP | 2002-287426 | A | 10/2002 |
| JP | 2003-076066 | A | 3/2003 |
| JP | 2003-302791 | A | 10/2003 |
| JP | 2005-062510 | A | 3/2005 |
| JP | 2005-099428 | A | 4/2005 |
| JP | 2005-106932 | A | 4/2005 |
| KR | 2003-0086350 | | 11/2003 |

*Primary Examiner*—Hoa V Le
(74) *Attorney, Agent, or Firm*—Buchanan Ingersoll & Rooney PC

(57) ABSTRACT

A binder resin for toner includes a hybrid resin of a crystalline resin (X) and an amorphous resin (Y), having a peak molecular weight of 30,000 or larger, and an amorphous resin (Z) having a peak molecular weight of smaller than 30,000.

16 Claims, 5 Drawing Sheets

5 μm (a)

105

(b)

100

(a)

(b)

BINDER RESIN FOR TONER, TONER, AND METHOD OF MANUFACTURING BINDER RESIN FOR TONER

TECHNICAL FIELD

The present invention relates to a binder resin for toner, a toner, and a method of manufacturing a binder resin for toner.

BACKGROUND ART

Fixability and anti-offset property of toner used for electrophotography or the like are in a trade-off relation. How to harmonize the both is therefore an important issue in designing a binder resin for toner. The toner is also required at the same time to have a good storability, in other words, to be not causative of blocking, which is aggregation of toner particles, in a fixing unit.

Aiming at responding these requirements, there has been known a technique of improving the fixability at low temperatures, by introducing a crystalline component into the binder resin composed of an amorphous resin. Because the crystalline resin sharply melts and lowers the viscosity at around the melting point thereof, the resin can be lowered in the viscosity only with a small amount of heat energy, and therefore improvement in the fixability is expectable.

Publicly-known techniques for introducing a crystalline resin into the binder resin composed of an amorphous resin include:

(A) a method of hybridizing an amorphous resin and a crystalline resin on the molecular chain basis, in a form of block copolymer or graft copolymer (see Patent Document 1, for example);

(B) a method of blending a well-compatible combination of an amorphous resin and a crystalline resin, by a physical method of kneading such as fusion blending and powder blending (see Patent Document 2, for example); and (C) methods of blending a less-compatible combination of an amorphous resin and a crystalline resin, by physical methods of kneading such as fusion blending and powder blending (see Patent Document 3 and Patent Document 4, for example).

However, the methods of (A) and (B) have failed in keeping a sufficient level of storability, because the amorphous portion and the crystalline portion are highly compatible, and a lot of crystalline polymer consequently remained ungrown to crystal in the amorphous portion. Therefore, a step of promoting and controlling the crystal growth, by annealing for a predetermined length of time, might be necessary (see Patent Document 5).

The method of (C) has raised difficulty in ensuring stability of toner characteristics, because the amorphous portion and the crystalline portion are less compatible, and diameter of dispersion of the crystalline resin was large as a consequence. Another known method is such as appropriately adjusting monomer composition of crystalline polyester and amorphous polyester, so as to control the compatibility between the both, and to thereby allow the crystalline polyester to disperse while keeping a diameter of dispersion of 0.1 to 2 μm (see Patent Document 6, for example). However, a problem in stability of toner characteristics remains unsolved even in this case, because the crystal size and the distribution thereof may vary depending on cooling conditions during manufacture of the binder resin and manufacture of the toner. Moreover, species of applicable monomers and composition are limitative.

Patent Document 7 describes a technique of manufacturing the binder resin, by polymerizing vinyl monomers under the presence of crystalline polyester having an unsaturated double bond on the molecular terminal.

[Patent Document 1] Japanese Laid-Open Patent Publication No. H4-26858

[Patent Document 2] Japanese Laid-Open Patent Publication No. 2001-222138

[Patent Document 3] Japanese Laid-Open Patent Publication No. S62-62369

[Patent Document 4] Japanese Laid-Open Patent Publication No. 2003-302791

[Patent Document 5] Japanese Laid-Open Patent Publication No. H1-35456

[Patent Document 6] Japanese Laid-Open Patent Publication No. 2002-287426

[Patent Document 7] Japanese Laid-Open Patent Publication No. H3-6572

DISCLOSURE OF THE INVENTION

However, the technique described in Patent Document 7 has raised a problem of poor anti-offset property and storability, because content of the crystalline polyester in the binder resin becomes large.

It is therefore an object of the present invention to provide a technique of harmonizing excellence in the low-temperature fixability and the anti-offset property of toner.

After extensive investigations, the present inventors completed the present invention described below.

According to the present invention, there is provided a binder resin for toner comprising a hybrid resin of a crystalline resin (X) and an amorphous resin (Y), having a peak molecular weight of 30,000 or larger, and an amorphous resin (Z) having a peak molecular weight of smaller than 30,000.

According to the present invention, the binder resin for toner is composed of a mixture of a hybrid resin of a crystalline resin and an amorphous resin, and an amorphous resin, so that the anti-offset property, the fluidity under hot atmosphere and the storability may be improved.

In the binder resin for toner of the present invention, the hybrid resin may be such as obtainable by synthesizing the amorphous resin (Y) under the presence of the crystalline resin (X) having double bonds.

The hybrid resin herein may be obtainable by the procedures below. First, a compound having hydroxyl group(s) or carboxyl group(s) (maleic acid group, for example) and an unsaturated bond, and a crystalline resin (crystalline polyester, for example) are reacted with each other so as to introduce the unsaturated double bonds into molecules of the crystalline resin, to thereby obtain the crystalline resin (X) having double bonds. Next, the crystalline resin (X) having double bonds and the amorphous resin (Y) (vinyl monomer, for example) are allowed to polymerize to thereby obtain the hybrid resin as a copolymer. A plurality of species of monomers may be used as the vinyl monomer.

The peak molecular weight herein may be defined as being calculated by the method of measurement described later. For the case where a plurality of peak molecular weights are observed, the peak molecular weight in this context may be defined by the peak molecular weight of largest abundance.

In the binder resin for toner of the present invention, the crystalline resin (X) may be a crystalline polyester-base resin, and the amorphous resin (Y) and the amorphous resin (Z) may be styrene-acryl-base resins.

In the binder resin for toner of the present invention, the crystalline resin (X) may be incompatible with the amorphous resin (Z), and the amorphous resin (Y) may be compatible with the amorphous resin (Z).

It is to be understood that "compatible" herein means that predetermined amounts of two species of resins dissolved and mixed in a solvent shows no separation after the solvent was removed, or that the island phase otherwise separated has a size of as large as 50 μm or below. For example, an allowable state is such that no separation is observed, or that the separated island phase is only as large as 50 μm or below, when 50 g each of two above-described resins were dissolved and mixed in 170 g of xylene, and the solvent was then removed. "Incompatible" herein means that the separated island phase after the similar operations is as large as 50 μm or more.

In the binder resin for toner of the present invention, the hybrid resin may be THF-insoluble and chloroform-soluble, and the amorphous resin (Z) may be THF-soluble.

The binder resin for toner of the present invention may have, as described later, a network structure having particles of the hybrid resin linked therein with each other. The network structure herein is formed not by chemically binding the particles of the hybrid resin, but based on interaction among the polymer chains induced by a phase separation phenomenon. The hybrid resin therefore may remain soluble into chloroform.

The binder resin for toner of the present invention may have a sea-island structure assuming the hybrid resin as a matrix and the amorphous resin (Z) as a domain.

By virtue of this configuration, melting characteristics inherent to the crystalline resin (X) composing the matrix can make a predominant contribution in the melted toner containing the binder resin for toner, even if the content of the crystalline resin (X) is small. As a consequence, the low-temperature fixability can be kept desirable, even under a small content of the crystalline resin (X). Also the storability and the anti-offset property can be improved because the content of the crystalline resin (X) can be reduced.

In the binder resin for toner of the present invention, the ratio of partial area of the matrix may be 60% or smaller, and mean particle size of the domain may be 2 μm or smaller.

In the binder resin for toner of the present invention, area of the matrix portion in the sea-island structure may be reduced. Even under such configuration, the low-temperature fixability may be kept at a desirable level, and the storability and the anti-offset property may be improved. By adjusting the mean particle size of domain at around this level, the low-temperature fixability may be improved, and thereby stable toner characteristics may be obtained.

The binder resin for toner of the present invention may contain micelles of the hybrid resin having a portion of the crystalline resin (X) oriented inwardly and having a portion of the amorphous resin (Y) oriented outwardly.

By virtue of the micelles thus formed by the hybrid resin in the binder resin for toner of the present invention, the network structure described later will more readily be producible, and thereby the low-temperature fixability may be improved.

The binder resin for toner of the present invention may have a network structure having the micelles linked with each other.

It is also made possible to allow the binder resin for toner to form a network structure, by controlling the molecular weights of the hybrid resin and the amorphous resin (Z) as described in the above.

The binder resin for toner of the present invention may have a network structure having particles of the hybrid resin linked therein with each other.

The network structure herein may be given as a continuous, or a partially-continuous phase of particles of the hybrid resin. The particles of the hybrid resin given with the network structure may improve the thermal response, and may lower the viscosity of the entire resin only with a small amount of thermal energy.

In the binder resin for toner of the present invention, the amorphous resin (Z) may be dispersed in the network structure.

By virtue of this configuration, the amorphous resin (Z) can readily disperse when the network structure composed of the particles of the hybrid resin is resolved. As a consequence, the low-temperature fixability of the toner may be improved even under a small content of the crystalline resin (X).

The binder resin for toner of the present invention may have an elastic modulus under storage at 100° C. of $2.0\times10^5$ Pa or smaller.

The binder resin for toner of the present invention may have an acid value of 1 mg KOH/g or more to 20 mg KOH/g or less.

According to the present invention, there is provided a toner containing any of the binder resins for toner described in the above, and a colorant.

By this configuration, the toner can harmonize excellence in the low-temperature fixability and the anti-offset property.

According to the present invention, there is provided a method of synthesizing an amorphous resin (Y), under the presence of a crystalline resin (X) having double bonds, to thereby form a hybrid resin of the crystalline resin (X) and the amorphous resin (Y), having a peak molecular weight of 30,000 or larger; and mixing the hybrid resin and an amorphous resin (Z) having a peak molecular weight of smaller than 30,000 to thereby form a binder resin for toner.

In the method of manufacturing a binder resin for toner of the present invention, the forming the binder resin for toner may further include: producing a resin mixture having the hybrid resin and the amorphous resin (Z) mixed in a solvent capable of dissolving the amorphous resin (Z); and removing the solvent from the resin mixture.

According to the present invention, excellent low-temperature fixability and the anti-offset property can be harmonized in toner.

BRIEF DESCRIPTION OF THE DRAWINGS

The above and other objects, advantages and features of the present invention will be more apparent from the following preferable embodiments described in conjunction with the accompanying drawings.

BEST MODES FOR CARRYING OUT THE INVENTION

The binder resin for toner of the present invention includes a hybrid resin of a crystalline resin (X) and an amorphous resin (Y), having a peak molecular weight of 30,000 or larger, and an amorphous resin (Z) having a peak molecular weight of smaller than 30,000. The binder resin for toner may contain a resin mixture which is a mixture of the hybrid resin (H) of the crystalline resin (X) and the amorphous resin (Y), and the unhybridized crystalline resin (X); and the amorphous resin (Z). The resin mixture may contain also the unhybridized amorphous resin (Y).

(Sea-Island Structure)

In the present invention, the binder resin for toner may have a sea-island structure assuming the hybrid resin (H) as a matrix and the amorphous resin (Z) as a domain.

In the binder resin for toner of the present invention, the ratio of partial area of the matrix may be adjusted to 60% or smaller. By adjusting the content of matrix to this level, the storability of the binder resin for toner may be improved.

Mean particle size of the domain in the binder resin for toner of the present invention may be adjusted to 2 μm or smaller. By adjusting the mean particle size of domain to this level, the low-temperature fixability may be improved, and thereby stable toner characteristics may be obtained.

Generally, the toner improves its low-temperature fixability as the content of crystalline resin (X) increases. In the binder resin for toner of the present invention, the domains composed of the amorphous resin (Z) having a very small particle size are dispersed in the matrix composed of the hybrid resin (H) containing the crystalline resin (X). By virtue of this configuration, when the hybrid resin (H) melts under heating of the toner for fixation, the matrix composed of the hybrid resin (H) resolves, and the amorphous resin (Z) having been dispersed therein while keeping a very small particle size can readily disperse. As a consequence, the low-temperature fixability of the toner may be improved, even under a small content of the crystalline resin (X).

(Network Structure)

In the present invention, the binder resin for toner may have a network structure (mesh structure) having particles of the hybrid resin (H) linked therein with each other. The structure of the binder resin for toner of the present invention is observable under a transmission electron microscope or a scanning probe microscope.

Figure 3:
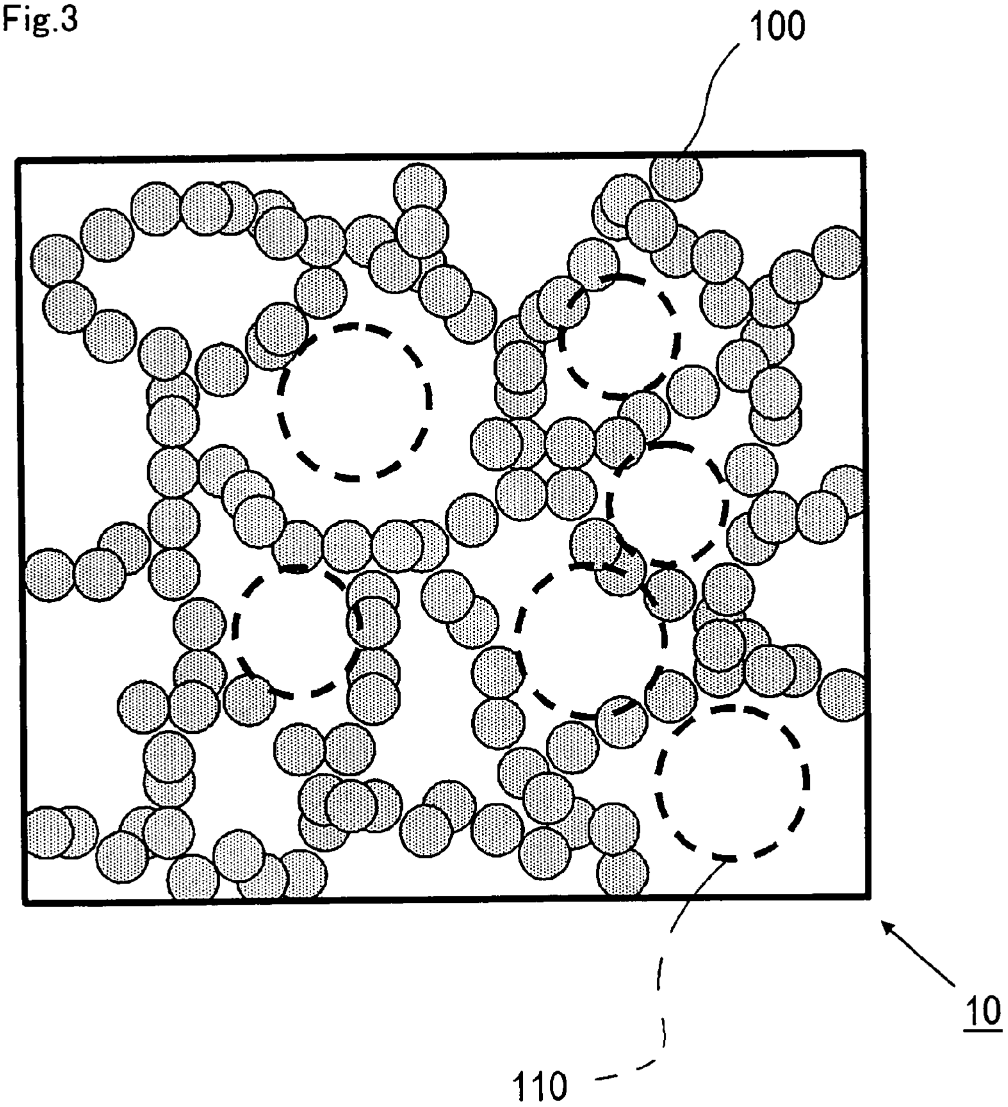
FIG. 3 is a drawing schematically showing a configuration having a network structure composed of hybrid resin (H) particles linked with each other.

FIG. 3 is a drawing schematically showing a configuration having a network structure in which particles of the hybrid resin (H) are linked with each other.

In a binder resin for toner 10 herein, particles 100 composed of the hybrid resin (H) are linked with each other to form a network structure. Although not shown in the drawing, the amorphous resin (Z) is disposed in mesh 110 of the network structure formed by the particles 100. In other words, the binder resin for toner 10 has a sea-island structure having a matrix composed of a network structure of the hybrid resin (H), and a domain composed of the amorphous resin (Z) dispersed therein.

Figure 4:
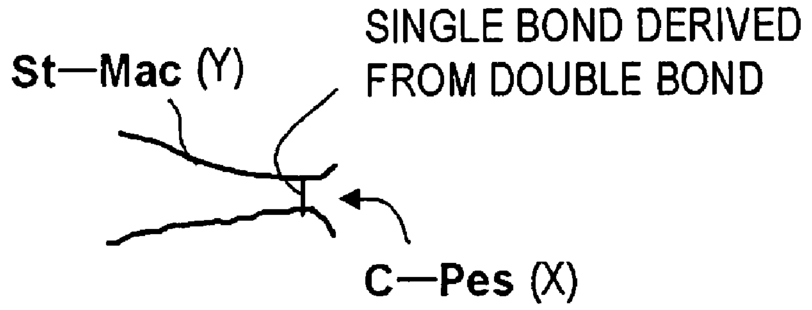
FIG. 4 is a schematic drawing finely depicting the hybrid resin (H)
Figure 4:
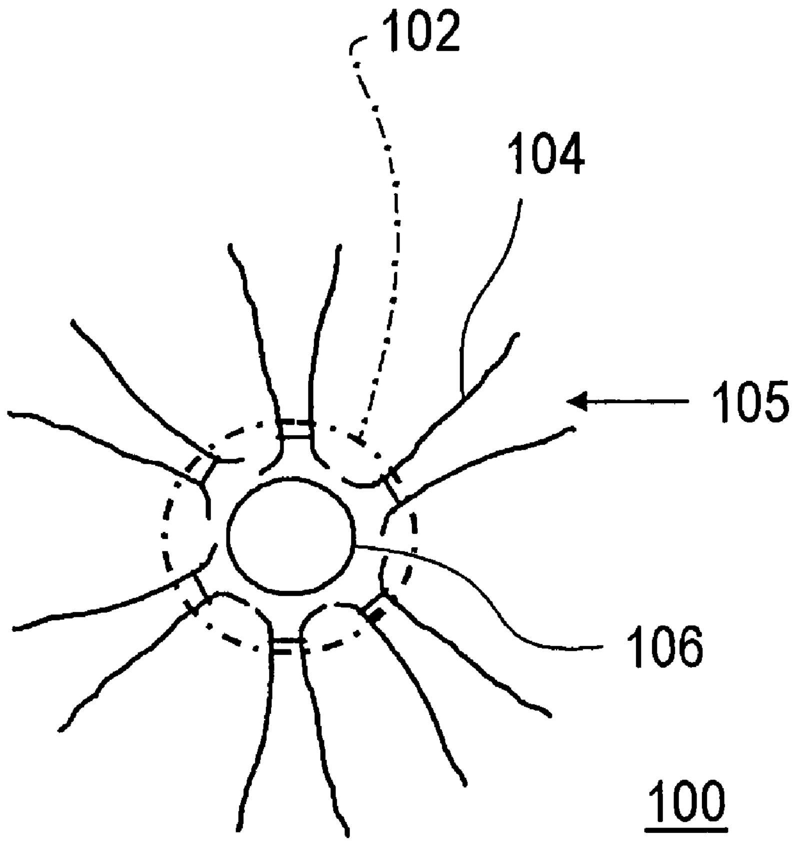

The present inventors made investigations into adjusting a material for composing the binder resin for toner of the present invention, so that the hybrid resin (H) can form the micelles having a portion of the crystalline resin (X) oriented inwardly and having a portion of the amorphous resin (Y) oriented outwardly, and so that the particles 100 of the hybrid resin (H) can be configured. FIG. 4(*a*) is a schematic drawing finely depicting the hybrid resin (H) 105. The hybrid resin (H) 105 shown herein is such as having a crystalline polyester-base resin (C-Pes) as the crystalline resin (X), and having a styrene-acryl-base resin (St-Mac) as the amorphous resin (Y). Before the hybrid resin 105 is formed, the crystalline resin (X) may be, for example, such as having double bonds ascribable to maleic anhydride. The hybrid resin 105 has this sort of single bonds derived from the double bonds. The amorphous resin (Y) herein preferably has a peak molecular weight larger than that of the crystalline resin (X).

For example, the crystalline resin (X) may have a peak molecular weight of 3,000 or more to 20,000 or less. The hybrid resin of the crystalline resin (X) and the amorphous resin (Y) may have a peak molecular weight of 30,000 or larger, and smaller than 1,000,000.

When a resin mixture containing thus-configured hybrid resin (H) 105 is mixed with the amorphous resin (Z), as shown in FIG. 4(*b*), the hybrid resin (H) supposedly forms a micelle having the crystalline resin (X) 102 portion oriented inwardly so as to surround unreacted crystalline resin (unreacted material 106) in the resin mixture, and having the amorphous resin (Y) 104 portion oriented outwardly. The particle 100 is formed in this way. It is to be understood that the particle 100 shown in FIG. 3 is similarly configured.

Figure 5:
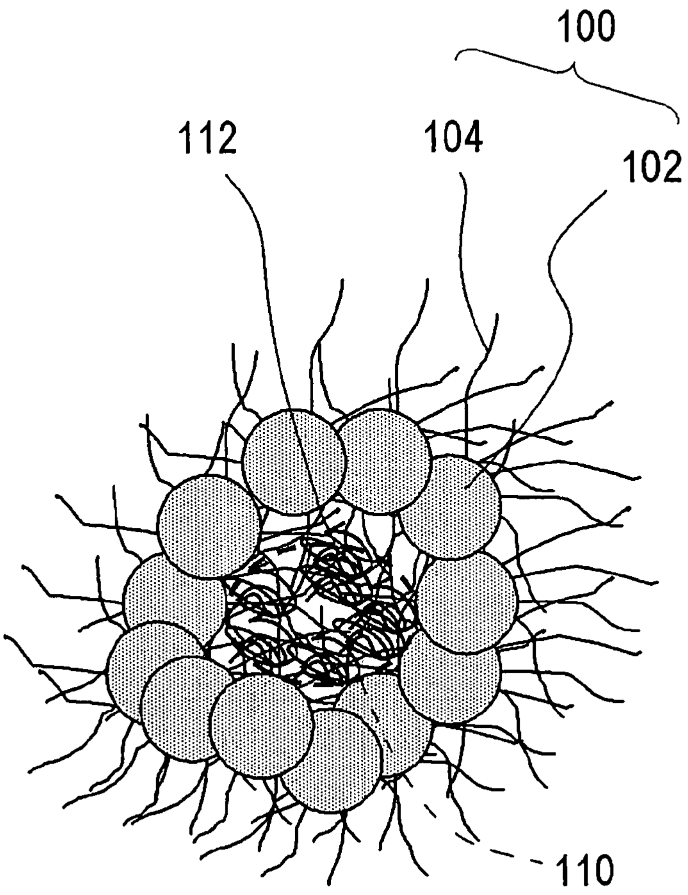
FIG. 5 is a schematic drawing finely depicting a single mesh portion shown in FIG. 3.
Figure 5:
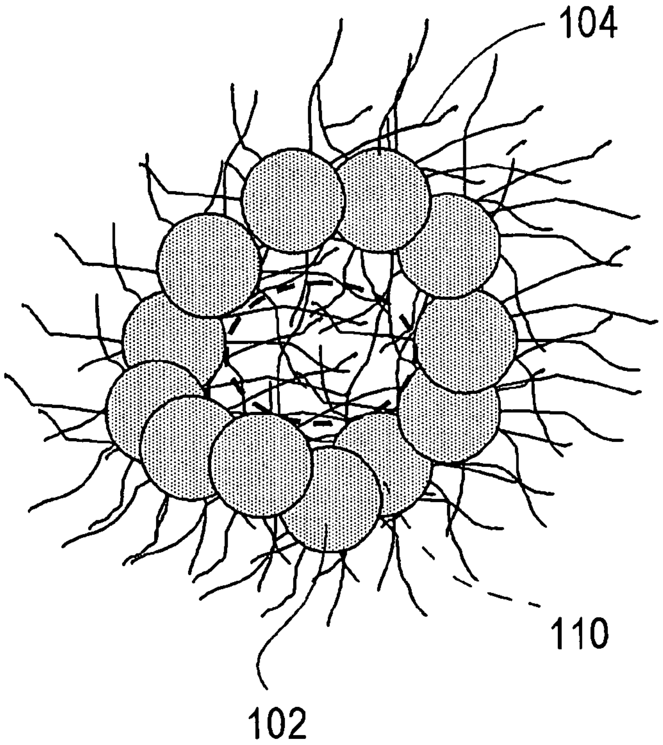

FIG. 5(*a*) is a schematic drawing finely depicting one of mesh 110 portions shown in FIG. 3. The amorphous resin (Z) 112 is placed in the mesh 110. By forming the micelles as shown in FIG. 4(*b*), the hybrid resin (H) 105 allows the crystalline resin (X) 102 to disperse uniformly into the amorphous resin (Y) 104 and the amorphous resin (Z) 112, while keeping the particle size thereof sufficiently smaller than the particle size of the toner. The particle size of the crystalline resin (X) 102 portion of the particles 100 may be adjusted, for example, to 0.01 μm or larger. The particle size of the crystalline resin (X) 102 portion of the particles 100 may be adjusted, for example to 1 μm or smaller, and preferably 0.1 μm or smaller. FIG. 5(*b*) shows a configuration having the amorphous resin (Z) 112 removed therefrom. As described later, if the binder resin for toner 10 is immersed into THF, the amorphous resin (Z) 112 dissolves into THF, and the mesh 110 is left as voids.

In the present invention, the micelle as shown in FIG. 4(*b*) is supposedly formed in the solvent, if the resin mixture containing the hybrid resin (H) is mixed with the amorphous resin (Z). The succeeding removal of the solvent induces phase separation of the hybrid resin of the crystalline resin (X) and the amorphous resin (Y) from the amorphous resin (Z), with progress of the removal of solvent. The amorphous resin (Y) herein has a large molecular weight as compared with the amorphous resin (Z), and there is therefore a large difference in the viscosity between both components. The phase separation occurs as a consequence, wherein the phase separation of the crystalline resin (X) is appropriately suppressed while being affected by the amorphous resin (Y) having a large molecular weight, thus allowing the amorphous resin (Z) having a small molecular weight and more soluble into the solvent to selectively produce nuclei. As a consequence, the hybrid resin (H) having a large molecular weight link with each other, to thereby form the network structure.

In the binder resin for toner of the present invention, the amorphous resin (Z) is dispersed in the network structure composed of the hybrid resin (H) containing the crystalline resin (X). The network structure is formed by the particles, composed of the micelles of the hybrid resin (H), linked with each other. It is therefore supposed that the network structure composed of the hybrid resin (H) readily resolves when the hybrid resin (H) melts under heating of the toner for fixation, so that also the amorphous resin (Z) dispersed therein can readily disperse. As a consequence, the low-temperature fixability of the toner may be improved, even under a small content of the crystalline resin (X).

Preferable materials used in the present invention will be described below.

(Crystalline Resin (X))

In the present invention, the crystalline resin (X) may be, for example, polyester-base resins, polyolefin-base resins, and hybrid resin (H) having these resins combined therein. The crystalline resin (X) may be a THF-insoluble component.

The crystalline resin (X) may typically be composed of a crystalline polyester-base resin. This configuration allows easy control of the melting point. The crystalline polyester-base resin herein is preferably adjusted to have a peak temperature of melting of 50° C. or above, and preferably 80° C. or above. By adjusting the peak temperature of melting to 50° C. or above, the storability may be improved. The crystalline polyester-base resin may be adjusted to have a peak temperature of melting of 170° C. or below, and preferably 110° C. or below. By adjusting the peak temperature of melting to 170° C. or below, the low-temperature fixability may be improved.

The crystalline polyester-base resin may be adjusted to have a peak molecular weight of 1,000 or larger. By adjusting the peak molecular weight to 1,000 or larger, the storability may be improved. The crystalline polyester-base resin may still further be adjusted to have a peak molecular weight of 100,000 or smaller. By adjusting the peak molecular weight to 100,000 or smaller, lowering in the crystallization speed may be avoidable, and the productivity may be improved.

The crystalline polyester-base resin may be a resin obtainable by allowing an aliphatic diol and an aliphatic dicarboxylic acid to react by condensation polymerization. The number of carbon atoms of the aliphatic diol herein is preferably 2 to 6, and more preferably 4 to 6. The number of carbon atoms of the aliphatic dicarboxylic acid is preferably 2 to 22, and more preferably 6 to 20.

The aliphatic diol having 2 to 6 carbon atoms can be exemplified by 1,4-butanediol, ethylene glycol, 1,2-propylene glycol, 1,3-propylene glycol, 1,6-hexanediol, neopentyl glycol, 1,4-butene diol and 1,5-pentanediol.

The aliphatic dicarboxylic acid having 2 to 22 carbon atoms can be exemplified by unsaturated aliphatic dicarboxylic acid such as maleic acid, fumaric acid, citraconic acid, itaconic acid, glutaconic acid; saturated aliphatic dicarboxylic acids such as oxalic acid, malonic acid, succinic acid, adipic acid, decanediol acid, undecanediol acid, dodecanedicarboxylic acid, hexadecanedionic acid, octadecanedionic acid and eicosanedionic acid; and anhydrides and alkyl (having 1 to 3 carbon atoms) esters of these acids.

The crystalline polyester-base resin is obtainable typically by allowing an alcoholic component and a carboxylic acid component to react with each other in an inert gas atmosphere, preferably at a temperature of 120 to 230° C. In this reaction, any publicly-known catalysts for esterification and any polymerization inhibitors may be used if necessary. It is also allowable to reduce pressure of the reaction system in the latter half of the polymerization reaction, so as to accelerate the reaction.

(Amorphous Resin)

In the present invention, the amorphous resin (Y) and the amorphous resin (Z) may be, for example, styrene-acryl-base resin, polyester-base resin, polyester-polyamide-base resin, and hybrid resin having these resins combined therein. The amorphous resin (Y) and the amorphous resin (Z) may also be THF-soluble components.

The amorphous resin (Y) and the amorphous resin (Z) are preferably the same kinds of resin.

The amorphous resin (Y) and the amorphous resin (Z) may typically be a styrene-acryl-base resin. The styrene-acryl-base resin is extremely low in hygroscopicity, and is excellent in environmental stability, and is therefore preferably used as the amorphous resin (Y) and the amorphous resin (Z) in the present invention.

In the present invention, the styrene-acryl-base resin may be a copolymer of a styrene-base monomer and an acryl-base monomer. The styrene-base monomer and the acryl-base monomer used for the styrene-acryl-base resin are not specifically limited, but may be those shown below.

The styrene-base monomer may typically be styrene, α-methylstyrene, p-methoxystyrene, p-hydroxystyrene and p-acetoxystyrene.

The acryl-base monomer may be, for example, acrylic acid; methacrylic acid; alkyl acrylates having an alkyl group having 1 to 18 carbon atoms such as methyl acrylate, ethyl acrylate, butyl acrylate, 2-ethylhexyl acrylate, lauryl acrylate and stearyl acrylate; alkyl methacrylates having an alkyl group having 1 to 18 carbon atoms such as methyl methacrylate, ethyl methacrylate, butyl methacrylate, 2-ethylhexyl methacrylate, lauryl methacrylate and stearyl methacrylate; hydroxyl-group-containing acrylates such as hydroxyethyl acrylate; hydroxyl-group-containing methacrylates such as hydroxyethyl methacrylate; amino-group-containing acrylates such as dimethylaminoethyl acrylate and diethylaminoethyl acrylate; amino-group-containing methacrylates such as dimethylaminoethyl methacrylate and diethylaminoethyl methacrylate; glycidyl-group-containing acrylates such as glycidyl acrylate and β-methylglycidyl acrylate; and glycidyl-group-containing methacrylates such as glycidyl methacrylate and β-methylglycidyl methacrylate.

Besides these, nitrile-base monomers such as acrylonitrile and methacrylonitrile, vinyl esters such as vinyl acetate; vinyl ethers such as vinyl ethyl ether; and unsaturated carboxylic acid or anhydride thereof, such as maleic acid, itaconic acid, and monoester of maleic acid may be used as monomers co-polymerizable with the above-described monomers.

Of these, styrene-base monomer, acrylic acid, methacrylic acid, alkyl acrylates having an alkyl group having 1 to 18 carbon atoms, alkyl methacrylates having an alkyl group having 1 to 18 carbon atoms, and unsaturated carboxylic acid are preferably used, and styrene, acrylic acid, methyl acrylate, ethyl acrylate, butyl acrylate, 2-ethylhexyl acrylate, lauryl acrylate, methacrylic acid, methyl methacrylate, ethyl methacrylate, butyl methacrylate, 2-ethylhexyl methacrylate and lauryl methacrylate are more preferably used.

Desirable properties of each of the amorphous resin (Y) and the amorphous resin (Z) will be described later.

(Amorphous Resin (Y))

As described in the above, styrene-acryl-base resin may be used as the amorphous resin (Y). Therefore, physical properties can readily be controlled. Also those containing butyl acrylate (BA) may be used as the amorphous resin (Y). The hybrid resin (H) can, therefore, be lowered in the glass transition temperature (Tg), and can be improved in the low-temperature fixability.

(Manufacture of Hybrid Resin (H))

The hybrid resin of the crystalline resin (X) and the amorphous resin (Y) (also simply referred to as "hybrid resin (H)", hereinafter) may be prepared typically by introducing double bonds into the crystalline resin (X), and by synthesizing the amorphous resin (Y) under the presence of the crystalline resin (X) having double bonds thus introduced therein.

The number of double bonds introduced into the crystalline resin (X) may be adjusted typically to 0.05 or more on the average, and more preferably 0.2 or more, per a single chain of crystalline polymer. By adjusting the number of double bonds to be introduced to 0.05 or more, a sufficient amount of hybrid resin (H) can be obtained, the crystalline resin (X) can be dispersed in a desirable manner, and thereby stable toner characteristics can be obtained. The number of double bonds to be introduced into the crystalline resin (X) may be adjusted to less than 1.5 on the average, and more preferably less than 1, per a single chain of crystalline polymer. By adjusting the number of double bonds to be introduced less than 1.5, content of unhybridized, unreacted crystalline resin (X) can be kept at an appropriate level, the crystallinity can be improved, and thereby the storability can be improved.

The crystalline resin (X) may be configured as having, on the terminal portion thereof, a functional group such as hydroxyl group, carboxyl group, epoxy group, amino group and isocyanate group. Introduction of double bonds into the crystalline resin (X) may be accomplished typically by allowing the terminal functional group of the crystalline resin (X) to react with a vinyl monomer having a functional group reactive with the functional group of the crystalline resin (X). The vinyl monomer having a functional group reactive with that functional group of the crystalline resin (X) can be exemplified by (meth) acrylic acid, maleic anhydride, itaconic anhydride, hydroxylethyl(meth)acrylate and glycidyl(meth) acrylate. Of these, by adding maleic anhydride to the crystalline resin (X) having a terminal hydroxyl group, a double bond can be introduced into the crystalline resin (X). Physical properties can, therefore, readily be controlled. In this case, content of vinyl monomer per 100 g of the crystalline resin (X) may be adjusted to 1 mmol or more to 200 mmol or less.

Addition of maleic anhydride to the crystalline resin (X) having a terminal hydroxyl group may be proceeded typically in an inert gas atmosphere, by allowing the source materials to react with each other preferably at a temperature of 120 to 180° C. The amount of charge of maleic anhydride is adjusted to 0.05% or more, and preferably 0.2% or more, relative to the hydroxyl group equivalent of the crystalline resin (X). By adjusting the amount of charge of maleic anhydride to 0.05% or more of the hydroxyl group equivalent of the crystalline resin (X), a sufficient amount of hybrid resin (H) can be obtained. Therefore, the crystalline resin (X) can more readily be dispersed, and thereby stable toner characteristics can be obtained. The amount of charge of maleic anhydride may preferably be adjusted to less than 75%, more preferably less than 50% of the hydroxyl group equivalent of the crystalline resin (X). By adjusting the amount of charge of maleic anhydride to less than 75% of the hydroxyl group equivalent of the crystalline resin (X), content of unhybridized, unreacted crystalline resin (X) can be kept at an appropriate level, and the crystallinity can be improved. Also the storability can be improved.

The present inventors also found out the following.

When double bonds are introduced into the crystalline resin (X) by maleic anhydride modification, the longer the maleic anhydride modification time will be, the better the yield of maleic anhydride modification will be, and the higher the yield of formation of micelles will be, as shown in FIG. 4(*b*). Mean particle size of the domain (corresponded to mesh of net 110 in FIG. 3) composed of the amorphous resin (Z) is affected by the state of formation of the micelles of the hybrid resin (H). More specifically, poor yield of formation of micelles may make the network structure less likely to produce, and thereby mean particle size of the domain may become large. The yield of formation of micelles is supposedly affected by the time of maleic anhydride modification of polyester resin. For an exemplary case where a hybrid resin of crystalline polyester-base resin and a styrene-acryl-base resin is used as the hybrid resin (H), mean particle size of domain after one hour of maleic anhydride modification will be 3 to 4 μm, whereas the mean particle size of domain can be reduced to 0.1 to 2 μm after 3 hours of maleic anhydride modification. Although the reason thereof remains unclear, it is supposedly because the time of maleic anhydride modification elongated to a certain degree may dimerize the crystalline resin (X), and thereby the micelles become more likely to produce.

Yield of formation of micelles may be adjustable also by controlling the amount of charge of maleic acid relative to the crystalline resin (X). A possible adjustment herein is such as maleic acid: a single crystalline polymer chain=1:2 by molar ratio. The acid value of the binder resin for toner may be adjustable to 1 mg KOH/g or more to 20 mg KOH/g or less. By virtue of this adjustment, the yield of formation of micelles can be raised, and thereby the network structure becomes more likely to produce. The mean particle size of domain can consequently be reduced, and thereby an effect of low-temperature fixability can be enhanced.

Synthesis of the amorphous resin (Y) under the presence of the crystalline resin (X) having double bonds introduced therein may be carried out by an arbitrary method selected, for example, from solution polymerization, bulk polymerization, suspension polymerization, emulsion polymerization, combination of bulk polymerization and solution polymerization and so forth. Of these, solution polymerization is preferable in view of readiness in control of polymerization.

Typical compositional ratio by mass of crystalline resin (X)/amorphous resin (Y) in the synthesis of the amorphous resin (Y) under the presence of the crystalline resin (X) having double bonds introduced therein may be, on the basis of the crystalline resin (X), 20/80 or more and less than 80/20, and more preferably 30/70 or more and less than 70/30. By adjusting the compositional ratio by mass of crystalline resin (X)/amorphous resin (Y) to 20/80 or more, on the basis of the crystalline resin (X), the fixability can desirably be improved. By adjusting the compositional ratio by mass of crystalline resin (X)/amorphous resin (Y) to less than 80/20, on the basis of the crystalline resin (X), stable toner characteristics may be developed, while suppressing the diameter of dispersion of the crystalline resin (X).

Peak molecular weight of the hybrid resin (H) of the crystalline resin (X) and the amorphous resin (Y) may be adjusted, for example, to 30,000 or larger, and preferably 70,000 or larger. By adjusting the peak molecular weight of the hybrid resin (H) to 30,000 or larger, the storability may be improved. The peak molecular weight of the hybrid resin (H) of the crystalline resin (X) and the amorphous resin (Y) may be adjusted to smaller than 1,000,000, preferably smaller than 800,000, and more preferably smaller than 500,000. By adjusting the peak molecular weight of the hybrid resin (H) to smaller than 1,000,000, an effect of improving the fixability may be ensured at a desirable level.

(Amorphous Resin (Z))

Peak molecular weight of the amorphous resin (Z) may be adjusted to 1,000 or larger, and preferably 3,000 or larger. By adjusting the peak molecular weight of the amorphous resin (Z) to 1,000 or larger, a sufficient level of strength of the resin may be obtained. The peak molecular weight may preferably be adjusted to smaller than 30,000. By adjusting the peak molecular weight to smaller than 30,000, a sufficient level of effect of improving the fixability may be obtained.

As the amorphous resin (Z), a styrene-acryl-base resin may be used as described in the above. The styrene-acryl-base resin in this case may preferably be adjusted to have a peak molecular weight of 1,000 or larger, preferably 3,000 or larger. By adjusting the peak molecular weight to 1,000 or larger, a sufficient level of strength of the resin may be obtained. Moreover, the styrene-acryl-base resin may be adjusted to have a peak molecular weight of smaller than 30,000. By adjusting the peak molecular weight to smaller than 30,000, a sufficient level of low-temperature fixability may be expressed.

The styrene-acryl-base resin may be adjusted to have a glass transition point of 10° C. or above. By adjusting the glass transition point to 10° C. or above, the storability may be improved. The styrene-acryl-base resin may also be adjusted so as to have a glass transition temperature to 140° C. or below. By adjusting the glass transition temperature to 140° C. or below, a sufficient level of low-temperature fixability may be expressed.

Methods of polymerizing the styrene-acryl-base resin may arbitrarily be selectable from solution polymerization, bulk polymerization, suspension polymerization, emulsion polymerization combination of bulk polymerization and solution polymerization, and so forth. Of these methods of polymerization, solution polymerization is preferably adopted. By adopting solution polymerization, resins having a lot of functional groups introduced therein or the resins having relatively small molecular weights may more readily be obtained.

(Binder Resin for Toner)

The binder resin for toner is obtainable by mixing the resin mixture containing the hybrid resin (H) with the amorphous resin (Z). Mixing of the resin mixture containing the hybrid resin (H) with the amorphous resin (Z) may be proceeded typically by a method of mixing using a solvent or the like. For the case where a method of mixing using a solvent is adopted, the solvent used herein may be such as capable of dissolving the amorphous resin (Z). Xylene, ethyl acetate, toluene, THF and so forth may be used as the solvents capable of dissolving the amorphous resin (Z). For the case where a method of mixing using a solvent is adopted, the binder resin for toner of the present invention is manufactured by removing the solvent from the resin solution.

Compositional ratio by mass of the resin mixture/amorphous resin (Z), considered when the resin mixture containing the hybrid resin (H) is mixed with the amorphous resin (Z), may typically be adjusted, on the basis of the resin mixture, to larger than 10/90 and not larger than 70/30, and preferably larger than 30/70 and not larger than 60/40. By adjusting the compositional ratio by mass of the resin mixture/amorphous resin (Z) to 70/30 or smaller, on the basis of the resin mixture, stable toner characteristics may be expressed. By adjusting the compositional ratio by mass of the resin mixture/amorphous resin (Z) to larger than 10/90, on the basis of the resin mixture, a sufficient level of anti-offset property may be expressed.

The binder resin for toner obtained by the method of manufacturing described in the above preferably gives a clear solution at temperatures at and above the melting point of the crystalline resin (X), and more preferably gives an almost clear solution with a bluish gloss.

Next, the network structure of the present invention will be explained in detail. In the following description, a network structure of the particles 100 as shown in FIG. 3 will be referred to as "a network structure having the crystalline resin (X) as one component". In the present invention, the network structure having the crystalline resin (X) as one component means a network structure having the crystalline resin (X) and unreacted crystalline resin as a skeleton component.

By virtue of this structure, properties of the crystalline resin, expressed by sharp decrease in the viscosity at around the melting point thereof, may be used in an effective manner. More specifically, the network structure of the present invention, having the crystalline resin (X) as one component, is higher in the thermal response as compared with publicly-known network structure having a three-dimensional mesh, and thereby the entire resin may be lowered in the viscosity only with a less amount of energy. In addition, lowering in the viscosity of resin in a molten state may be suppressed. As a consequence, more excellent fixability may be exhibited, while keeping a desirable level of anti-offset property. As has been described in the above, because the micelles of the hybrid resin (H) are formed in the binder resin for toner of the present invention, the hybrid resin (H) may uniformly be formed in the toner particles, while keeping the size thereof sufficiently smaller than the toner. By virtue of this configuration, stable toner characteristics may be expressed, only with a small variation in the quality among the particles.

The network structure having the crystalline resin (X) as one component has features described below, in comparison with the publicly-known techniques of introducing crystalline resins:

(a) the crystalline resin (X) and the amorphous resin are incompatible in a molten state, and never mix with each other;

(b) the crystalline resin (X) possibly degrading the storability is distributed, while keeping a size of 0.1 μm or smaller, in a high-molecular-weight, or high-glass-transition-point (Tg) resin having an effect of improving the storability; and (c) the crystalline resin (X) exists as one component composing a continuous phase or a partially-continuous phase, rather than being randomly dispersed.

By virtue of feature (a), the crystalline resin incapable of growing up to crystal becomes less likely to remain in the amorphous portion, so that a sufficient level of storability may be ensured. In addition, by virtue of feature (b), the interface between the crystalline resin and the amorphous resin is protected by the high-molecular-weight, or high-Tg resin having an effect improving the storability, so that a sufficient level of storability may be ensured.

Also by virtue of feature (b), the crystalline resin is dispersed while keeping a size of 0.1 μm or smaller, so that the stability of toner characteristics may be ensured. In general, a polymer blend composed of a plurality of components shows characteristics (melting characteristics) of causing transition from solid to high-viscosity melt, and further to low-viscosity melt, wherein in particular in the molten state with a high viscosity, the melting characteristics inherent to the component composing the continuous phase makes a predominant contribution.

Therefore, by virtue of feature (c), only a small amount of introduction of the crystalline resin may improve the melting characteristics of the entire resin, and may improve the fixability. As a consequence, only a small amount of introduction of the crystalline resin will suffice, thereby solving both problems of ensuring a sufficient level of storability, and of ensuring stability of the toner characteristics.

The network structure may directly be observed typically under a scanning probe microscope (SPM), without being extracted using THF. SPM is an apparatus capable of detecting physical information, such as visco-elasticity, with a nano-scale resolution power, and can provide well-contrasted imaging of the network component from the other components.

The binder resin for toner manufactured by the method of the present invention preferably satisfy the following conditions.

(1) heat energy for melting crystal measured by DSC is 5 J/g or more, and peak temperature of melting is 60° C. or more to 120° C. or less, and heat energy for melting crystal measured by DSC is 40 J/g or less. This condition indicates that the crystalline resin is contained in the binder resin for toner.

(2-1) Elastic modulus under storage (G') at 180° C. is $1.0\times10^2$ Pa or larger. This condition indicates that a component suppressive to lowering in the viscosity of molten resin is contained in the binder resin for toner. This indicates anti-high-temperature-offset property. The elastic modulus under storage (G') at 180° C. herein may be adjusted to $1.0\times10^6$ Pa or smaller.

(2-2) Elastic modulus under storage (G') at 100° C. is $2.0\times10^5$ Pa or smaller. This condition indicates that the resin is lowered in the viscosity at high temperatures above the melting point (approximately 80° C.) of the crystalline resin (X). This indicates excellence in the fixability. The elastic modulus under storage (G') at 100° C. may be adjusted to $1.0\times10^3$ Pa or larger. The elastic modulus under storage (G') at 60° C. may be adjusted to $5.0\times10^6$ Pa or more to $3.0\times10^7$ Pa or less.

(3) Assuming the initial signal intensity of free induction decay curve (FID) of $^1$H nucleus determined by pulse NMR measurement based on the Carr-Purcell-Meiboom-Gill (CPMG) method, at a measurement temperature of 160° C., an observation pulse width of 2.0 μsec and a repeating time of 4 sec, as 100%, a relative signal intensity after 20 ms is 30% or smaller, and a relative signal intensity after 80 ms is 20% or smaller. This condition indicates that the crystalline resin contained in the binder resin for toner is introduced into the amorphous resin while keeping a size sufficiently smaller than that of the toner particle, and that, in the molten binder resin which is in a molten state, the polymer chain of the crystalline resin is not freely movable, due to interaction with the polymer chain of the amorphous resin.

By satisfying the above-described conditions, it is indicated that:

(A) the crystalline resin is introduced into the amorphous resin, while keeping a sufficiently small size, and in a crystallizable state;

(B) the crystalline resin is in a state incapable of freely moving as being hindered by the amorphous resin, even when the binder resin is in a molten state; and (C) a component suppressive to lowering in the viscosity of the molten resin exists in the binder resin.

In other words, the feature of (b) "the crystalline resin (X) possibly degrading the storability is distributed, while keeping a size of 0.1 μm or smaller, in a high-molecular-weight, or high-glass-transition-point (Tg) resin having an effect of improving the storability", which is a feature of the network structure having the crystalline resin as one component, is indicated by the above (A), (B), and physical properties of source resin, and the feature of (c) "the crystalline resin exists as one component composing a continuous phase or a partially-continuous phase, rather than being randomly dispersed" is indicated by the above (B), (C), and physical properties of source resin. The feature of (a) "the crystalline resin and the amorphous resin are incompatible in a molten state, and never mix with each other" is indicated by physical properties of source resins.

(Differential Scanning Calorimetry (DSC))

The above condition (1) is evaluated using differential scanning calorimetry (DSC). The method of measurement is as follows. The sample is heated at a rate of 10° C./min from 20° C. to 170° C., cooled at a rate of 10° C./min down to 0° C., and again heated at a rate of 10° C./min up to 170° C. The binder resin for toner of the present invention herein preferably shows a heat energy for melting crystal, observed in the second temperature elevation, of 1 J/g or more and less than 50 J/g, more preferably 5 J/g or more and less than 40 J/g, and still more preferably 10 J/g or more and less than 30 J/g. In this case, the peak temperature of melting is 50° C. or higher and lower than 130° C., preferably 60° C. or higher and lower than 120° C., and more preferably 70° C. or higher and lower than 110° C. The effect of improving the fixability may be obtained when the heat energy for melting crystal is 1 J/g or larger. The toner characteristics are stabilized when the heat energy for melting crystal is less than 50 J/g. The storability may be improved when the peak temperature of melting is 50° C. or higher. The effect of improving the fixability may be obtained when the peak temperature of melting is lower than 130° C.

(Measurement of Visco-Elasticity)

In the present invention, the conditions (2-1) and (2-2) are evaluated using a rheometer. The measurement is carried out at a gap length of 1 mm, at a frequency of 1 Hz, at a rate of 2° C./min from 50° C. up to 200° C. In this case, elastic modulus under storage (G') at 180° C. of the binder resin for toner of the present invention is 50 Pa or more to $1.0\times10^4$ Pa or less, preferably $1.0\times10^2$ Pa or more to $9.0\times10^3$ Pa or less, and more preferably $3.0\times10^2$ Pa or more to $8.0\times10^3$ Pa or less. When G' is adjusted to 50 Pa or larger, a sufficient level of anti-offset property may be obtained. When G' is adjusted to $1.0\times10^4$ Pa or smaller, the fixability may be improved. The elastic modulus under storage (G') at 100° C. is $1.0\times10^3$ Pa or more to $2.0\times10^5$ Pa or less, preferably $2.0\times10^3$ Pa or more to $1.8\times10^5$ Pa or less, and more preferably $3.0\times10^3$ Pa or more to $1.5\times10^5$ Pa or less.

(Pulse NMR)

In the present invention, the condition (3) is evaluated by pulse NMR. The pulse NMR is a general analytical technique adopted as a method of evaluating mobility of polymer molecular chain and interactive state of different components, and the evaluation is made by measuring $^1$H transverse relaxation time of all components composing the resin. Lower mobility of the polymer chain results in shorter relaxation time, and in faster attenuation of signal intensity, so that relative signal intensity assuming the initial signal intensity as 100% decreases within a shorter time. On the other hand, higher mobility of the polymer chain results in longer relaxation time, and in slower attenuation of signal intensity, so that relative signal intensity assuming the initial signal intensity as 100% gradually decreases over a long duration of time. The pulse NMR measurement is carried out based on the Carr-Purcell-Meiboom-Gill (CPMG) method, at a measurement temperature of 160° C., an observation pulse width of 2.0 μsec, and a repetition time of 4 sec. In the pulse NMR measurement, assuming the initial signal intensity of free induction decay curve (FID) of $^1$H nucleus as 100%, the binder resin for toner of the present invention shows a relative signal intensity after 20 ms of 3% or larger and smaller than 40%, preferably 3% or larger and smaller than 30%, and more preferably 3% or larger and smaller than 20%, and a relative signal intensity after 80 ms of 0.5% or larger and smaller than 30%, preferably 0.5% or larger and smaller than 20%, and more preferably 0.5% or larger and smaller than 10%.

When the relative signal intensity after 20 ms is 3% or larger, and the relative signal intensity after 80 ms is 0.5% or larger, an effect of improving the fixability may be observed. When the relative signal intensity after 20 ms is smaller than 40%, and the relative signal intensity after 80 ms is smaller than 30%, the toner characteristics may be stabilized.

The binder resin for toner of the present invention may be separated into a soluble component and an insoluble component, typically in an extraction test using a solvent such as tetrahydrofuran (THF). Content of the THF-insoluble portion is 10% by mass or more to 90% by mass or less, preferably 15% by mass or more to 85% by mass or less, in the binder resin. By adjusting the content of the THF-insoluble portion, a desired level of anti-offset property may be obtained.

Figure 2:
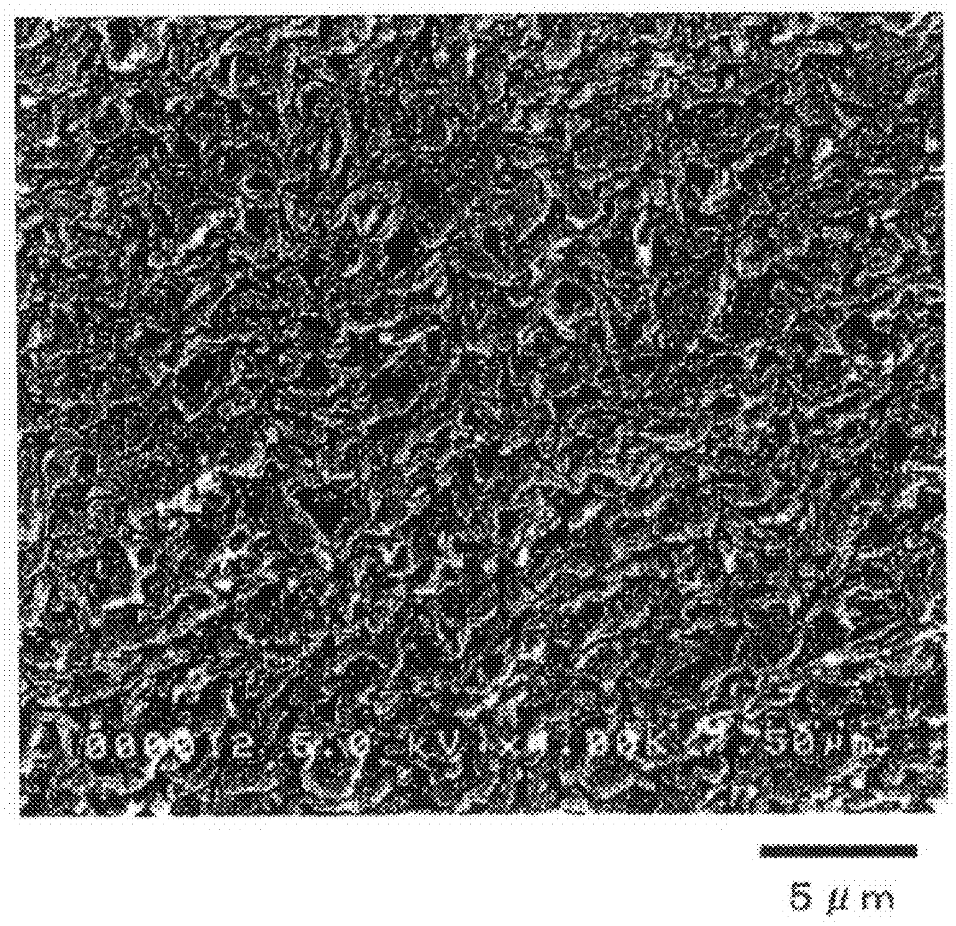
FIG. 2 is a drawing showing an example of electron microphotograph of a THF-insoluble component extracted from the binder resin for toner used in Example 4.

The THF extraction test is carried out by immersing the solid-state resin into THF, and then drying it under reduced pressure at an ambient temperature. The THF-insoluble portion generally decays in the geometry when immersed in THF, but by virtue of the network of the hybrid resin composed of the THF-insoluble crystalline portion, the hybrid resin never dissolved into THF, and the hybrid resin network may be observed as shown in FIG. 2. The amorphous resin (Z) dissolves when immersed in THF, and leaves the void as shown in FIG. 2.

If the crystalline resin is randomly dispersed in the amorphous resin (Z) without forming the network, the amorphous resin (Z) dissolves into THF, and the crystalline resin, insoluble to THF, remains in the THF solution while keeping the particle form.

The THF-soluble portion composed of the amorphous resin (Z) is generally observed under a scanning electron microscope (SEM) as a porous structure having a mean pore size of 0.05 or more to 2 μm or less, preferably 0.1 or more to 1 μm or less. By adjusting the mean pore size to 0.05 μm or larger, the storability may be improved, and by adjusting to 2 μm or smaller, the toner characteristics may be stabilized.

By observing the insoluble component while being dissolved in THF, the feature such that "the THF-soluble component, which is the amorphous resin (Z), gives the pore structure, and the hybrid resin gives the network structure composed of the THF-insoluble component" may be confirmed with a larger probability.

The binder resin for toner of the present invention is soluble to chloroform. By virtue of this feature, it is confirmed that the hybrid resin (H) forms the network structure having micelles linked with each other, rather than having the general three-dimensional mesh structure linked by chemical bonds. Based on capability of forming the micelles, it is also confirmed that the hybrid resin (H) contains the amorphous resin (Y).

(Electrophotographic Toner)

The binder resin for toner of the present invention may be given as an electrophotographic toner, together with a colorant, and optionally-added charge control agent, wax and pigment dispersion aid, by any publicly-known methods.

Any publicly-known methods may be adoptable as the methods of preparing the electrophotographic toner of the present invention. For example, the electrophotographic toner may be obtained by preliminarily mixing the binder resin for toner of the present invention, a colorant, a charge adjusting agent, a wax and so forth, kneading the mixture in a molten state under heating using a biaxial kneader, finely crushing the product using a crusher after being cooled, classifying the product using an air classifier, and collecting particles ranging from 8 to 20 μm in general. In this case, preferable conditions for melting under heating in a biaxial kneader include a resin temperature at the discharge port of the biaxial kneader of lower than 165° C., and a residence time of shorter than 180 seconds. Content of the binder resin for toner in the electrophotographic toner obtained as described in the above may be adjustable depending on purposes. The content is preferably 50% by mass or more, and more preferably 60% by mass or more. The upper limit of the content is preferably 99% by mass.

The colorant may typically be exemplified by publicly-known organic and inorganic pigments such as black pigments such as carbon black, acetylene black, lamp black and magnetite; chrome yellow, yellow iron oxide, hanza yellow G, quinoline yellow lake, permanent yellow NCG, cis-azo yellow, molybdenum orange, vulcan orange, indane threne, brilliant orange GK, red oxide (iron red), quinacridone, brilliant carmine 6B, alizarin lake, methylviolet lake, fast violet B, cobalt blue, alkali blue lake, phthalocyanine blue, fast sky blue, pigment green B, malachite green lake, titanium oxide, zinc oxide and so forth. The content generally ranges from 5 to 250 parts by mass per 100 parts by mass of the binder resin for toner of the present invention.

As the wax, it is allowable, if necessary, to partially add and use polyvinyl acetate, polyolefin, polyester, polyvinyl butyral, polyurethane, polyamide, rosin, modified rosin, terpene resin, phenol resin, aliphatic hydrocarbon resin, aromatic petroleum resin, paraffin wax, polyolefin wax, aliphatic amide wax, vinyl chloride resin, styrene-butadiene resin, coumarone-indene resin, melamine resin and so forth, within a range that the effect of the present invention will not be impaired.

Also publicly-known charge adjusting agent, such as nigrosine, quaternary ammonium salt and metal-containing azo dye may appropriately be selected and used, wherein the amount of use is preferably adjusted to 0.1 to 10 parts by mass per 100 parts by mass of the binder resin for toner of the present invention.

EXAMPLE 1

The present invention will further be detailed below, referring to Examples.

Method of Manufacturing (Exemplary Manufacturing of Crystalline Resin (X))

Source monomers listed in Table 1 were respectively placed in a 1-L, four-necked flask attached with a nitrogen introducing tube, a dehydration tube and a stirrer, and allowed to react at 150° C. for 1 hour. Next, 0.16% by mass, relative to the total amount of monomers, of titanium lactate (TC-310 from Matsumoto Chemical Industry Co., Ltd.) was added, the mixture was moderately heated up to 200° C., and allowed to react for 5 to 10 hours. The mixture was further allowed to react under a reduced pressure of 8.0 kPa for approximately 1 hour, and the reaction was terminated when the acid value was measured as 2 (mg KOH/g) or below. The obtained crystalline resins were referred to as "a", "b" and "b'".

TABLE 1

(Crystalline Resin (X))

| | Source resin a | Source resin b | Source resin b' |
|---|---|---|---|
| Diol (g) | 1,4-Butanediol 115 | 1,6-Hexanediol 115 | 1,4-Butane diol 115 |
| Dicarboxylic acid (g) | Octadecanedionic acid 385 | Sebacic acid 500 | $C_{20}$ Dicarboxylic acid (from Mitsui Chemicals, Inc.) Almatex C20 400 |
| Melting peak temperature (° C.) | 88 | 67 | 80 |

(Manufacture of Hybrid Resin (H))

(Case 1: a-1)

In a 4-L, four-necked flask attached with a nitrogen introducing tube, a dehydration tube and a stirrer, 500 g of the above-described source resin "a" and 7.2 g of maleic anhydride were placed, and allowed to react at 150° C. for 2 hours, to obtain a maleic acid adduct. Next, 500 g of xylene, 490 g of styrene, and 10 g of methacrylic acid were added, the mixture was heated to 85° C., 3 g of t-butyl peroxyoctoate was added, and the mixture was allowed to react for 4 hours. The mixture was further added with 1 g of t-butyl peroxyoctoate, allowed to react for 2 hours, and this cycle was repeated three times to manufacture hybrid resin (H) "a-1". The peak molecular weight of hybrid resin (H) "a-1" (St-MAC-MPES) was found to be 150,000.

(Case 2: a-2)

In a 4-L, four-necked flask attached with a nitrogen introducing tube, a dehydration tube and a stirrer, 500 g of the above-described source resin "a" and 8.9 g of maleic anhydride were placed, and allowed to react at 150° C. for 2 hours, to obtain a maleic acid adduct. In a separate 2-L, four-necked flask attached with a nitrogen introducing tube, a dehydration tube and a stirrer, 500 g of xylene was placed, heated to the reflux temperature of xylene (approximately 138° C.), and thereto a mixed solution containing 490 g of styrene, 10 g of methacrylic acid and 1 g of t-butyl peroxyoctoate, and 500 g of the above-described maleic acid adduct were added dropwise over 5 hours, and the mixture was further allowed to react for 1 hour. Next, the mixture was cooled to 90° C., added with 1 g of t-butyl peroxyoctoate, allowed to react for 2 hours, and this cycle was repeated twice to manufacture hybrid resin (H) "a-2". The peak molecular weight of hybrid resin (H) "a-2" (St-MAC-MPES) was found to be 70,000.

(Case 3: b)

In a 4-L, four-necked flask attached with a nitrogen introducing tube, a dehydration tube and a stirrer, 500 g of the above-described source resin "b" and 8.9 g of maleic anhydride were placed, and allowed to react at 150° C. for 2 hours, to obtain a maleic acid adduct. In a separate 2-L, four-necked flask attached with a nitrogen introducing tube, a dehydration tube and a stirrer, 500 g of xylene was placed, heated to the reflux temperature of xylene (approximately 138° C.), and thereto a mixed solution containing 490 g of styrene, 10 g of methacrylic acid and 1 g of t-butyl peroxyoctoate, and 500 g of the above-described maleic acid adduct were added dropwise over 5 hours, and the mixture was further allowed to react for 1 hour. Next, the mixture was cooled to 90° C., added with 1 g of t-butyl peroxyoctoate, allowed to react for 2 hours, and this cycle was repeated twice to manufacture hybrid resin (H) "b". The peak molecular weight of hybrid resin (H) "b" (St-MAC-MPES) was found to be 70,000.

(Case 4: b')

In a 4-L, four-necked flask attached with a nitrogen introducing tube, a dehydration tube and a stirrer, 500 g of the above-described source resin "b'" and 10.8 g of maleic anhydride were placed, and allowed to react at 165° C. for 3 hours, to obtain a maleic acid adduct. In a separate 2-L, four-necked flask attached with a nitrogen introducing tube, a dehydration tube and a stirrer, 500 g of xylene was placed, heated to the reflux temperature of xylene (approximately 135° C.), and thereto a mixed solution containing 490 g of styrene, 10 g of methacrylic acid, 1 g of butyl acrylate and 1 g of t-butyl peroxyoctoate, and 500 g of the above-described maleic acid adduct were added dropwise over 5 hours, and the mixture was further allowed to react for 1 hour. Next, the mixture was cooled to 98° C., added with 1 g of t-butyl peroxyoctoate, and allowed to react for 6 hours to manufacture hybrid resin (H) "b'". The peak molecular weight of hybrid resin (H) "b'" (St-MAC-MPES-BA) was found to be 100,000.

(Manufacture of Amorphous Resin (Z))

In a 2-L, four-necked flask attached with a nitrogen introducing tube, a dehydration tube and a stirrer, 500 g of xylene was placed, heated to the reflux temperature of xylene (approximately 138° C.), and thereto source monomers and a reaction initiator listed in Table 2 were respectively added dropwise over 5 hours. The reaction was allowed to continue further 1 hour, the mixture was then cooled to 98° C., added with 2.5 g of t-butyl peroxyoctoate, and allowed to react for 2 hours. The obtained polymer solution was heated to 195° C., and the solvent was removed under a reduced pressure of 8.0 kPa for 1 hour. The obtained resins were referred to as source resins "c" and "d".

Source resin "e" was manufactured by the method below. In an autoclave equipped with a stirrer, 504 g of xylene, source monomers and a reaction initiator listed in Table 2 were charged, the mixture was heated to 208° C. under pressure, to obtain a polystyrene polymer solution having a peak molecular weight of 5,000. The obtained polymer solution was heated to 195° C., and the solvent was removed under a reduced pressure of 8.0 kPa for 1 hour. The obtained resin was referred to as source resin "e".

TABLE 2

(Amorphous Resin (Z))

| | Source resin c | Source resin d | Source resin e |
|---|---|---|---|
| Styrene (g) | 485 | 393 | 504 |
| Butyl acrylate (g) | 15 | 57 | 0 |
| Methacrylic acid (g) | 0 | 50 | 0 |
| Di-t-butyl peroxide (g) | 50 | 2 | 2.5 |
| Glass transition point (° C.) | 60 | 93.4 | 60 |
| Peak molecular weight | 5,000 | 47,000 | 5,000 |

(Manufacture of Binder Resin for Toner (Mixing of Hybrid Resin (H) and Amorphous Resin (Z), and Solvent Removal))

In a 2-L, four-necked flask attached with a nitrogen introducing tube, a dehydration tube, and a stirrer, the source resins having compositions listed in Table 3 were respectively placed, heated to 190° C., and the solvent was removed under a reduced pressure of 8.0 kPa for 1 hour. The obtained resins were referred to as resins "A" to "D". The solvent used herein was xylene.

EXAMPLES 1 TO 4

One hundred parts by mass of each of the resins "A" to "D" listed in Table 3, 6 parts by mass of carbon black (REGAL 330r from Cabot Corporation), and 1 part by mass of charge control agent (Bontron S34 from Orient Chemical Industries, Ltd.) were thoroughly mixed using a Henschel mixer, kneaded under fusion in a biaxial kneader (Model PCM-30 from Ikegai) at a set temperature of 110° C. and a residence time of 60 seconds, cooled, and then crushed. The product was then further milled and classified using a jet mill, to thereby obtain a powder having volume average particle size of 8.5 μm. One hundred parts by mass of the obtained powder was added with 0.5 parts by mass of an external additive (AEROSIL r972 from Nippon Aerosil Co., Ltd.), and mixed using a Henschel mixer, to obtain an electrophotographic toner. The electrophotographic toners obtained from resins "A" to "D" were respectively referred to as Examples 1 to 4. Various characteristics of Examples 1 to 4 were shown in Table 5 and Table 6.

TABLE 3

| | | Peak molecular weight | Example 1 A | Example 2 B | Example 3 C | Example 4 D | Comp. Example 1 E | Comp. Example 2 |
|---|---|---|---|---|---|---|---|---|
| Hybrid resin (H) | Source resin b (St-MAC-MPES) | 70,000 | | | 500 g | | | |
| | Source resin a-2 (St-MAC-MPES) | 70,000 | | 500 g | | | | |
| | Source resin a-1 (St-MAC-MPES) | 150,000 | 500 g | | | | 500 g | |
| | Source resin b' (St-MAC-MPES-BA) | 100,000 | | | | 500 g | | |
| Amorphous resin (Z) | Source resin c (St-BA) | 5,000 | 500 g | 500 g | 500 g | | | 500 g |
| | Source resin e (St) | 5,000 | | | | 500 g | | |
| Amorphous resin | Source resin d (St-BA-MAC) | 47,000 | | | | | 500 g | |
| | St-MAC + free PES | 5,000 | | | | | | 500 g |

COMPARATIVE EXAMPLE 1

A toner was manufactured similarly to as in Example 1, except that resin "E" listed in Table 3 was used.

COMPARATIVE EXAMPLE 2

A resin was manufactured by a process similar to that in Case 1 for manufacturing hybrid resin (H), except that maleic anhydride was not added, and by using the resultant resin in place of resin "A", a binder resin for toner was manufactured similarly to as Example 1. Also thereafter, a toner was manufactured completely similarly to as in Example 1.

COMPARATIVE EXAMPLE 3

In Comparative Example 3, a styrene-acryl-base resin prepared by the method described below was used.

To a solution containing 57.4 parts by mass of styrene, 11.9 parts by mass of n-butyl acrylate, 0.7 parts by mass of methacrylic acid, and 30 parts by mass of xylene, a solution prepared by homogeneously dissolving 0.6 parts by mass of di-t-butyl peroxide in 100 parts by mass of styrene was continuously supplied at a rate of 750 cc/h, into a 5-L reaction vessel kept at an internal temperature of 190° C., and an internal pressure of 0.59 MPa so as to proceed polymerization, to thereby obtain a low-molecular-weight polymer solution (peak molecular weight=5,000).

Separately, 75 parts by mass of styrene, 23.5 parts by mass of n-butyl acrylate, and 1.5 parts by mass of methacrylic acid were charged in a nitrogen-substituted flask, the temperature was elevated to an inner temperature of 120° C., and bulk polymerization was allowed to proceed at that temperature for 10 hours. The mixture was then added with 50 parts of xylene, and further with a mixture of 0.1 parts of di-t-butyl peroxide and 50 parts by mass of xylene preliminarily mixed and dissolved over 8 hours while keeping the temperature at 130° C., the polymerization continued for additional 2 hours, to thereby obtain a high-molecular-weight polymer solution (peak molecular weight=350,000).

Next, 100 parts by mass of the low-molecular-weight polymer solution and 100 parts by mass of the high-molecular-weight polymer solution were mixed, the solvent or the like was removed by flashing the mixture into a vessel kept at 160° C., 1.33 kPa, to thereby manufacture a binder resin for toner.

Thereafter, a toner was manufactured completely similarly to as in Example 1.

COMPARATIVE EXAMPLE 4

In Comparative Example 4, a crosslinked styrene-acryl-base resin prepared by the method described below was used.

Seventy-five parts by mass of xylene was charged in a nitrogen-substituted flask, and heated up to the reflux temperature of xylene (approximately 138° C.). A mixture containing 65 parts by mass of styrene, 30 parts by mass of n-butyl acrylate, 5 parts by mass of glycidyl methacrylate, and 1 parts by mass of di-t-butyl peroxide preliminarily mixed and dissolved was added dropwise into the flask, continuously over 5 hours, and the reaction was allowed to continue for additional 1 hour. Thereafter the reaction was allowed to proceed for additional 2 hours while keeping the internal temperature at 130° C., to thereby complete the polymerization. The product was flashed into a vessel kept at 160°

C., 1.33 kPa so as to remove the solvent or the like, to thereby obtain a glycidyl-group-containing vinyl resin.

One hundred parts by mass of the low-molecular-weight polymer solution (peak molecular weight=5,000) and 60 parts by mass of the high-molecular-weight polymer solution (peak molecular weight=350,000) obtained similarly to as in Comparative Example 3 were mixed, and the solvent or the like was removed by flashing the mixture into a vessel kept at 160° C., 1.33 kPa. Ninety-seven parts by mass of this resin mixture and 3 parts by mass of the glycidyl-group-containing vinyl resin described in the above were mixed in a Henschel mixer, and then kneaded and reacted in a biaxial kneader (Model KEXN S-40 from Kurimoto, Ltd.) at a resin temperature at the discharge portion of 170° C., and a residence time of 90 seconds.

Thereafter, a toner was manufactured completely similarly to as in Example 1.

COMPARATIVE EXAMPLE 5

In Comparative Example 5, a binder resin for toner having an amorphous polyester and a crystalline polyester blended therein under fusion, prepared by the method described below, was used.

In a 5-L, four-necked flask attached with a nitrogen introducing tube, a dehydration tube and a stirrer, 1013 g of 1,4-butanediol, 143 g of 1,6-hexanediol, 1450 g of fumaric acid, and 2 g of hydroquinone were placed, the mixture was allowed to react at 160° C. for 5 hours, then heated to 200° C. and allowed to react for 1 hour, and further allowed to react for 1 hour at 8.3 kPa, to thereby obtain a crystalline polyester.

Source monomers listed in Table 4, and 4 g of dibutyl tin oxide were placed in a 5-L, four-necked flask attached with a nitrogen introducing tube, a dehydration tube, a stirrer, and a thermocouple, and allowed to react at 220° C. for 8 hours. The reaction was further allowed to proceed at 8.3 kPa for approximately 1 hour, to thereby obtain an amorphous polyester.

Thereafter, 20 parts by mass of the crystalline polyester, 60 parts by mass of amorphous polyester "A", and 20 parts by mass of amorphous polyester "B" were blended in 70 parts by mass of xylene, and the solvent was then removed to manufacture a binder resin for toner. Thereafter, a toner was manufactured similarly to as in Example 1.

TABLE 4

| | Amorphous polyester A | Amorphous polyester B |
|---|---|---|
| BPA-PO (g) | 2000 | |
| BPA-BO (g) | 800 | |
| Ethylene glycol (g) | | 400 |
| Neopentyl glycol (g) | | 1200 |
| Terephthalic acid (g) | 600 | 1900 |
| Dodecenyl succinic anhydride | 500 | |
| Trimellitic anhydride (g) | | 700 |

(Abbreviation: BPA-PO: propylene oxide adduct of bisphenol-A (mean molar number of addition: 2.2 mol), BPA-BO: ethylene oxide adduct of bisphenol-A (mean molar number of addition: 2.2 mol))

COMPARATIVE EXAMPLE 6

In Comparative Example 6, a binder resin for toner having an amorphous resin and a crystalline resin grafted thereto, manufactured by the method described below was used.

In a 1-L separable flask attached with a nitrogen introducing tube, a dehydration tube, and a stirrer, 100 g of toluene, 15 g of styrene, 5 g of n-butyl acrylate, and 0.04 g of benzoyl peroxide were placed, and allowed to react at 80° C. for 15 hours. Thereafter, the mixture was cooled to 40° C., added with 85 g of styrene, 10 g of n-butyl methacrylate, 5 g of acrylic acid, and 4 g or benzoyl peroxide, re-heated to 80° C., and allowed to react for 8 hours. The obtained polymer solution was heated to 195° C., and the solvent was removed at a reduced pressure of 8.0 kPa or below for 1 hour, and thereby an amorphous resin was obtained.

Fifteen parts by mass of source resin "b", 85 parts by mass of the above-described amorphous resin, 0.05 parts by mass of p-toluenesulfonic acid, and 100 parts by mass of xylene were placed in a 3-L separable flask, allowed to reflux at 150° C. for 1 hour, and xylene was then removed using an aspirator and a vacuum pump, to thereby obtain a graft copolymer.

Thereafter, a toner was manufactured completely similarly to as in Example 1.

Methods of Measurement (Measurement of Molecular Weight)

Molecular weight distribution of the toner and binder resin composed only of the tetrahydrofuran-soluble amorphous resin was measured by gel permeation chromatography (TWINCLE HPLC from JASCO Corporation), under the conditions listed below:

detector: RI detector (SE-31, SHODEX);

column: GPCA-80M×2+KF-802×1 (SHODEX);

mobile phase: tetrahydrofuran; and flow rate: 1.2 ml/min.

Peak molecular weight of resin samples was calculated using an analytical curve prepared using a monodisperse standard polystyrene.

Molecular weight distribution of the toner and the binder resin, containing a chloroform-soluble crystalline resin and a hybrid resin (H), were measured by gel permeation chromatography (Shodex GPCSYSTEM-21 from Showa Denko KK), under the conditions listed below:

detector: RI detector;

column: GPC K-G+K-806L+K-806L (SHODEX)

column temperature: 40° C.;

mobile phase: chloroform; and flow rate: 1.0 ml/min.

Peak molecular weight of resin samples was calculated using an analytical curve prepared using a monodisperse standard polystyrene.

(Measurement of Softening Point)

Softening point of the binder resin was measured using a full-automatic dropping point apparatus (FP5/FP53 from Mettler), under the conditions listed below:

diameter of dropping port: 6.35 mm;

temperature elevation speed: 1° C./min; and elevation start temperature: 100° C.

Samples taken out from the reaction vessel, and in a molten state, was poured into a sampling holder carefully so as to avoid entrainment of air, cooled to normal temperatures, and then set onto a measurement cartridge.

(Peak Temperature of Melting, Heat Energy and Glass Transition Temperature)

Peak temperature of melting of crystal, heat energy for melting crystal, and glass transition temperature of the toner or the binder resin, and their THF-insoluble components were determined using a differential thermal analyzer (DSC-Q1000 from TA Instruments). In the process of temperature elevation at 10° C./min from 20° C. up to 170° C., followed by cooling at 10° C./min down to 0° C., and by re-heating at 10° C./min up to 170° C., the peak temperature of melting, and the glass transition temperature observed in the second temperature elevation were calculated conforming to JIS K7121 "Testing Methods for Transition Temperatures of Plastics". Measured value of the glass transition temperature was determined by extrapolation of starting temperature of glass transition. The heat energy for melting crystal at the second temperature elevation was calculated based on the area of an endothermic peak, conforming to JIS K7122 "Testing Methods for Heat of Transitions of Plastics".

(Measurement of Visco-Elasticity)

Visco-elasticity of the toner and the binder resin was measured using a rheometer (STRESS TECH from Rheologica Instruments AB), under the conditions listed below:

mode of measurement: oscillation strain control;

gap length: 1 mm;

frequency: 1 Hz;

plate: parallel plate;

measurement temperature: 50° C. to 200° C.; and temperature elevation speed: 2° C./min.

Resin sample powder was melted on a measurement stage heated at 150° C., molded to give a 1-mm-thick parallel plate, then the measurement was started after the plate was cooled down to 50° C. Elastic moduli under storage (G') at 100° C. and 180° C. were determined from the measurement.

(Pulse NMR Measurement)

The toner and the binder resin were measured by pulse NMR using a solid NMR spectrometer (HNM-MU25 from JEOL, Ltd.), under the conditions listed below:

sample form: powder;

measurement technique: Carr-Purcell-Meiboom-Gill (CPMG) method;

observed nuclei: $^1H$;

measurement temperature: 160° C.;

observation pulse width: 2.0 μsec;

repetition time: 4 sec; and number of times of integration: 8 times.

Assuming initial signal intensity of $^1H$ nucleus determined from a free induction decay curve (FID) as 100%, relative signal intensities observed after 20 ms and 80 ms were determined.

(Geometrical Observation: Network, Micelle, Ratio of Partial Area of Matrix, and Mean Particle Size of Domain)

The THF-insoluble components of the toner and the binder resin were subjected to SEM observation at an arbitrary magnification, using a scanning electron microscope (S-800 from Hitachi, Ltd.).

Using a transmission electron microscope (H-7000 from Hitachi, Ltd.), the toner and the binder resin were observed at an arbitrary magnification. Samples for the TEM observation were prepared as extra-thin slices by using an ultra-microtome under cooling, and measured after being dyed with ruthenium. In this method of dying, the hybrid resin (H) is observed dark, and the amorphous resin (Z) is observed as being faintly colored. Unhybridized, unreacted crystalline resin (X) is observed as being bright.

Samples showing dark particle components of approximately 0.1 μm in diameter distributed therein was judged as "micelle observed". Samples showing none of such dark particle components, or showing dark particle components of 100 μm or around were judged as "no micelle".

Samples showing that dark particle components of approximately 0.1 μm in diameter are linked with each other to form a network structure were judged as "network observed". In this case, the amorphous resin (Z) was observed in the mesh of the network. Samples showing the dark particle components of approximately 0.1 μm in diameter, but simply in a form of dispersion were judged as "no network".

Ratio of partial area of matrix was measured as follows. A transparent sheet is placed on a TEM photograph dyed as described in the above, and all particles corresponded to the amorphous resin (Z) were traced with a pen and transcribed onto the sheet. Next, the trace was analyzed using an image analysis software (Image-Pro Plus from Planetron, Inc.), and the area of the amorphous resin (Z) per a single TEM photograph was calculated. The residual portion was assumed as the matrix portion (the network composed of gathering of the micelles) composed of the hybrid resin (H), and the area thereof was calculated. Based on these areas, ratio of partial area of matrix (%) was calculated. The mean particle size of domain was determined by finding mean area of the amorphous resin (Z) surrounded by the matrix, and expressed by the diameter of a circle having the same area with the mean area.

(Fractionation of THF-Insoluble Portion)

One gram of the toner or the binder resin was immersed still in 100 ml of THF at room temperature for 3 days, and filtered. Insoluble matter was isolated, and allowed to dry in vacuo under the conditions of 1 kPa or below at 30° C. for 10 hours, to thereby obtain the THF-insoluble portion. The obtained THF-insoluble component was subjected to SEM observation.

TABLE 5

| | Micelle | Network | Ratio of partial area of matrix (%) | Mean particle size of domain (μm) | State of THF erosion | Network (after THF erosion) |
|---|---|---|---|---|---|---|
| Example 1 | observed | ○ | 45 | 2 | insoluble | ○ |
| Example 2 | observed | ○ | 50 | 1.5 | insoluble | ○ |
| Example 3 | observed | ○ | 45 | 1.5 | insoluble | ○ |
| Example 4 | observed | ○ | 50 | 1 | insoluble | ○ |
| Comparative Example 1 | observed | x | 50 | none | insoluble | x |
| Comparative Example 2 | none | x | 50 | none | partially sedimented | x |

TABLE 5-continued

| | Micelle | Network | Ratio of partial area of matrix (%) | Mean particle size of domain (μm) | State of THF erosion | Network (after THF erosion) |
|---|---|---|---|---|---|---|
| Comparative Example 3 | none | x | none | none | dissolved | x |
| Comparative Example 4 | none | x | none | none | dissolved | x |
| Comparative Example 5 | none | x | none | none | partially sedimented | x |
| Comparative Example 6 | none | x | none | none | dissolved | x |

TABLE 6

| | Heat energy for melting crystal (J/g) | Peak temperature for melting (° C.) | G' (Pa)/ 100° C. | G' (Pa)/ 180° C. | Relative peak intensity (%)/20 ms | Relative peak intensity (%)/80 ms | Acid value (mgKOH/g) |
|---|---|---|---|---|---|---|---|
| Example 1 | 24 | 110 | 130,000 | 210 | 23 | 12 | 9 |
| Example 2 | 22 | 113 | 150,000 | 100 | 29 | 19 | 12 |
| Example 3 | 18 | 90 | 90,000 | 120 | 25 | 15 | 9 |
| Example 4 | 21 | 70 | 100,000 | 115 | 28 | 15 | 5 |
| Comparative Example 1 | 24 | 110 | 300,000 | 300 | 23 | 12 | 15 |
| Comparative Example 2 | 25 | 1110 | 10,000 | 6 | 42 | 29 | 8 |
| Comparative Example 3 | 0 | 0 | 350,000 | 2800 | 4.5 | 0.9 | 13 |
| Comparative Example 4 | 0 | 0 | 500,000 | 5140 | 3.6 | 0.7 | 23 |
| Comparative Example 5 | 36 | 108 | 280,000 | 60 | 76 | 44 | 25 |
| Comparative Example 6 | 0 | 0 | 250,000 | 3 | 15 | 4 | 30 |

(Electron Microscopy)

Figure 1:
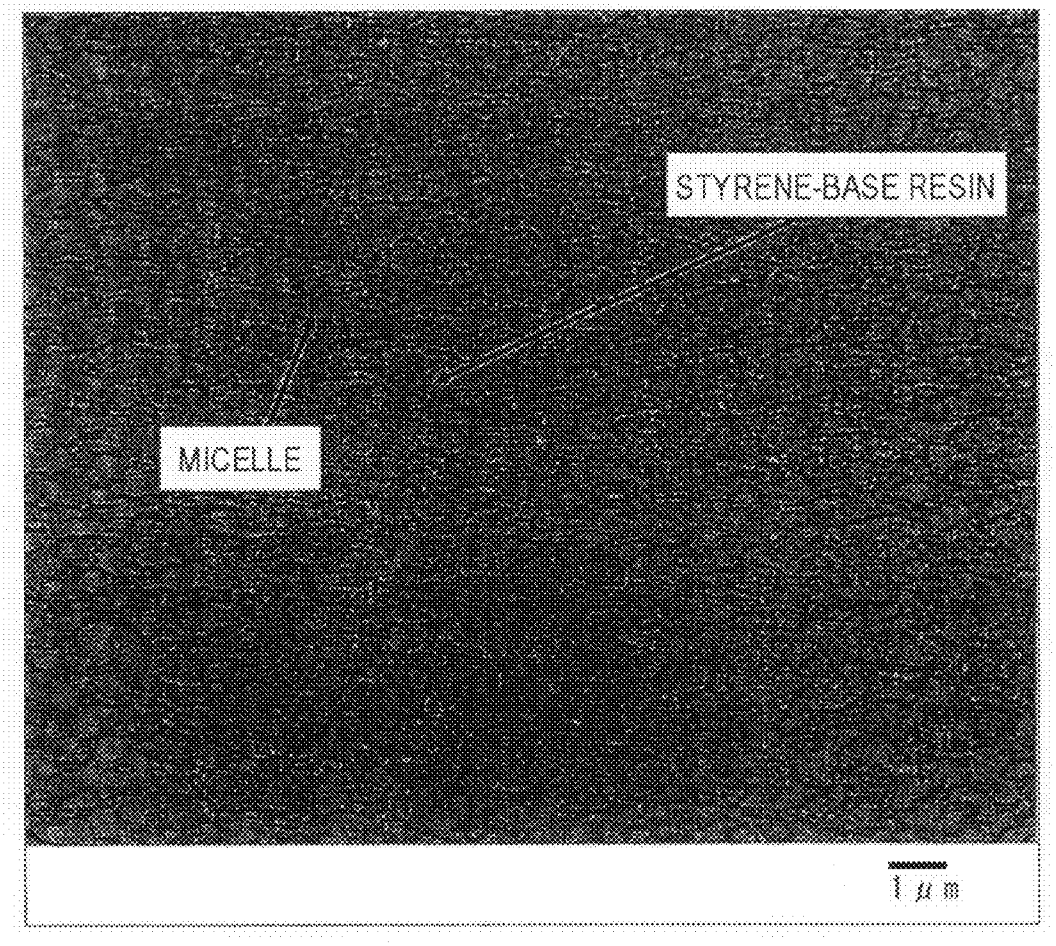
FIG. 1 is a drawing showing an example of scanning electron microphotograph of a binder resin for toner used in Example 4.

Examples of scanning electron microphotograph of the binder resin for toner used in Example 4 are shown in FIG. 1 and FIG. 2.

FIG. 1 is a scanning electron microphotograph of the binder resin for toner used in Example 4. The portions looks dark in the drawing indicate the portions where the micelles of the hybridized crystalline polyester resin link with each other to form the network. The domain portions dispersed among the dark-looking portions, looks faintly colored, indicate the styrene-base resin. FIG. 2 is a scanning electron microphotograph of the THF-insoluble portion extracted from the binder resin for toner shown in FIG. 1. It is found that the portions looks faintly colored in FIG. 1 have been dissolved into THF to leave voids.

(Evaluation of Performance of Toner)

Fixability, anti-offset property, storability, and stability were evaluated as described below. Those not given with "×" in any items were judged as acceptable.

(Fixability)

An unfixed picture was produced using a copying machine modified from a commercial electrophotographic copying machine, and the unfixed picture was then fixed using a heat roller fixer obtained by modifying a fixation unit of the commercial copying machine so as to allow arbitrary control of temperature and fixing speed. The fixing speed by the heat roll was adjusted to 190 mm/sec, and the toner was fixed while varying temperature of the heat roller in 10° C. steps. Thus-obtained fixed picture was rubbed 10 times using a sand eraser (plastic-and-sand eraser "MONO" from Tombow Pencil Co., Ltd.) under a load of 1.0-Kg-weight, and densities of picture before and after the friction test were measured using a Macbeth reflective densitometer. Of the individual steps of temperature yielding rates of change in the picture density of 60% or larger, the lowest one was defined as the lowest fixation temperature, and was evaluated according to the criteria below. The heat roller fixer used herein has no silicone oil supplying mechanism. That is, an anti-offset liquid is not used. Environmental conditions are normal temperature and normal pressure (22° C., 55% relative humidity).

AAA: lowest fixation temperature is lower than 120° C.;

AA: lowest fixation temperature is 120° C. or higher, and lower than 150° C.; and A: lowest fixation temperature is 150° C. or higher.

(Anti-Offset Property)

Range of temperature not causative of offset in copying (referred to as anti-offset temperature range) was evaluated according to the criteria below. A series of results are shown in Table 7. The anti-offset property was evaluated, conforming to the measurement of the above-described lowest fixation temperature. More specifically, an unfixed picture was prepared using the above-described copying machine, a toner image was transferred, and the picture was fixed using the above-described heat roller fixer. Next, an operation such that a white transfer paper is fed to the heat roller fixer under the same conditions, so as to visually observe whether any dirt of the toner is found on the transfer paper or not, was repeated while stepwisely elevating the set temperature of the heat roller fixer. In this test, the lowest temperature yielding the dirt of toner was defined as the hot offset producing temperature. Similarly, the test was also carried out while stepwisely lowering the set temperature of the heat roller fixer, and the highest temperature causative of dirt of the toner was defined as the cold offset producing temperature. Difference between the hot offset and cold offset producing temperatures was defined as the anti-offset temperature range, and evaluated according to the criteria below. Environmental conditions are normal temperature and normal pressure (22° C., 55% relative humidity).

AAA: anti-offset temperature range is 50° C. or larger;

AA: anti-offset temperature range is smaller than 50° C., not smaller than 30° C.; and A: anti-offset temperature range is smaller than 30° C.

(Storability)

Degree of aggregation of powder after the toner was allowed to stand at 50° C. for 24 hours was visually observed, and judged according to the criteria below. A series of results are shown in Table 7.

AAA: absolutely no aggregation;

AA: slightly aggregated; and

A: completely aggregated.

(Stability)

Quality of the toner particle was confirmed by visually evaluating the toner. The toner excellent in the pigment dispersibility showed black gloss, whereas poorly dispersed pigment looked gray. A series of results are shown in Table 7.

AAA: black glossy toner;

AA: mat black toner; and

A: gray toner.

TABLE 7

| | Fixability | Anti-offset property | Storability | Stability |
|---|---|---|---|---|
| Example 1 | AAA | AAA | AA | AA |
| Example 2 | AAA | AA | AAA | AAA |
| Example 3 | AAA | AA | AAA | AAA |
| Example 4 | AAA | AAA | AA | AAA |
| Comparative Example 1 | A | AA | AA | AA |
| Comparative Example 2 | A | A | A | A |
| Comparative Example 3 | A | AAA | AA | AAA |
| Comparative Example 4 | A | AAA | AAA | AAA |
| Comparative Example 5 | AA | AAA | A | AAA |
| Comparative Example 6 | AAA | AA | A | AA |

As shown in the above, formation of the micelles was confirmed in Example 1 to Example 4. Also formation of the network structure was confirmed. In Example 1 to Example 4, this sort of network structure was formed supposedly in the process of removal of the solvent. On the other hand, in Comparative Example 1, formation of the micelles was confirmed but formation of the network structure was not confirmed. The network structure was not formed in Comparative Example 1 supposedly because the phase separation state in the process of removal of the solvent differed from those in Example 1 to Example 4, due to large peak molecular weight of the amorphous resin (Z). Largeness in the molecular weight of the amorphous resin (Z) degrades the low-temperature fixability of the toner.

In Example 1 to Example 4, the elastic moduli under storage (G') at 100° C., which is higher than the peak temperature of melting of the hybrid resin (H) used therein, were found to be $2.0\times10^5$ Pa or smaller. From these results, it is found that the resin is lowered in the viscosity at higher temperatures exceeding the peak temperature of melting. Such lowering in the viscosity occurs supposedly because, in Example 1 to Example 4, the network structure decays when the crystalline resin (X) in the hybrid resin (H) melts, and accordingly also the amorphous resin (Z) dispersed in the network structure could readily disperse. As a consequence, the low-temperature fixability may be improved, and at the same time the wettability may be improved.

The binder resin for toner of the present invention may readily be crushed when the toner is prepared, and can keep strength against electrification under friction of the toner, because it is composed of the high-molecular-weight hybrid resin (H) and the low-molecular-weight amorphous resin (Z) mixed therein.

The binder resin for toner of the present invention is in no need of precisely controlling the compatibility between the crystalline resin (X) and the amorphous resin (Y) when the hybrid resin (H) is manufactured, and can therefore allow wide ranges of selection of resin and monomer.

The binder resin for toner of the present invention may further contain an amorphous resin having a still larger peak molecular weight than the amorphous resin (Z) has, in addition to the hybrid resin (H) and the amorphous resin (Z). Also in this configuration, a network structure similar to that described in the above may be formed, because the hybrid resin (H) and the amorphous resin are blended under the presence of the amorphous resin (Z) having a relatively small peak molecular weight.

The present invention also includes the embodiments below:

(1) a method of manufacturing a binder resin for toner, including a first process of synthesizing a resin mixture containing a hybrid resin (H) having a peak molecular weight of 30,000 or larger, and having therein a crystalline resin (X) and an amorphous resin (Y) bound with each other through chemical bonds, and a second process of mixing the resin mixture with an amorphous resin (Z) having a peak molecular weight of smaller than 30,000;

(2) the method as described in (1), wherein the resin mixture is synthesized by synthesizing the amorphous resin (Y) under the presence of crystalline resin (X) having double bonds introduced therein;

(3) a binder resin for toner obtained by the method described in (1), containing a network structure having a crystalline resin as one component thereof;

(4) a binder resin for toner obtained by the method described in (1), satisfying all of the conditions (a) to (c) below:

(a) having a heat energy for melting crystal measured by DSC of 5 J/g or larger, and a peak temperature of melting of 60 to 120° C.;

(b) having an elastic modulus under storage (G') at 180° C. of 100 Pa or larger; and (c) having a relative signal intensity after 20 ms is 30% or smaller, and a relative signal intensity after 80 ms is 20% or smaller, as observed in pulse NMR measurement based on the Carr-Purcell-Meiboom-Gill (CPMG) method, assuming the initial signal intensity of free induction decay curve (FID) of $^1$H nucleus to be determined as 100%;

(5) a binder resin for toner obtained by the method described in (1), composed of a tetrahydrofuran (THF)-soluble component and a THF-insoluble component, and swells over the entire bulk thereof when this resin in a bulk form is immersed into THF; and (6) a toner containing the binder resin for toner obtainable by the method described in (1).

The invention claimed is:

1. A binder resin for toner comprising a hybrid resin of a crystalline resin (X) and an amorphous resin (Y), having a peak molecular weight of 30,000 or larger, and an amorphous resin (Z) having a peak molecular weight of smaller than 30,000.

2. The binder resin for toner as claimed in claim 1, wherein said hybrid resin is obtained by synthesizing said amorphous resin (Y) under the presence of said crystalline resin (X) having double bonds.

3. The binder resin for toner as claimed in claim 1, wherein said crystalline resin (X) is a crystalline polyester-base resin, and said amorphous resin (Y) and said amorphous resin (Z) are styrene-acryl-base resins.

4. The binder resin for toner as claimed in claim 1, wherein said crystalline resin (X) is incompatible with said amorphous resin (Z), and said amorphous resin (Y) is compatible with said amorphous resin (Z).

5. The binder resin for toner as claimed in claim 1, wherein said hybrid resin is THF-insoluble and chloroform-soluble, and said amorphous resin (Z) is THF-soluble.

6. The binder resin for toner as claimed in claim 1, having a sea-island structure with said hybrid resin as a matrix and said amorphous resin (Z) as a domain.

7. The binder resin for toner as claimed in claim 6, wherein ratio of partial area of said matrix is 60% or smaller, and mean particle size of said domain is 2 μm or smaller.

8. The binder resin for toner as claimed in claim 1, containing micelles of said hybrid resin having a portion of said crystalline resin (X) oriented inwardly and having a portion of said amorphous resin (Y) oriented outwardly.

9. The binder resin for toner as claimed in claim 8, having a network structure of said micelles linked with each other.

10. The binder resin for toner as claimed in claim 1, having a network structure of particles of said hybrid resin linked with each other.

11. The binder resin for toner as claimed in claim 9, wherein said amorphous resin (Z) is dispersed in said network structure.

12. The binder resin for toner as claimed in claim 1, having an elastic modulus under storage at 100° C. is $2.0\times10^5$ Pa or smaller.

13. The binder resin for toner as claimed in claim 1, having an acid value of 1 mg KOH/g or more to 20 mg KOH/g or less.

14. A toner comprising the binder resin for toner described in claim 1, and a colorant.

15. A method of manufacturing a binder resin for toner comprising:

synthesizing an amorphous resin (Y), under the presence of a crystalline resin (X) having double bonds, to thereby form a hybrid resin of said crystalline resin (X) and said amorphous resin (Y), having a peak molecular weight of 30,000 or larger; and mixing said hybrid resin and an amorphous resin (Z) having a peak molecular weight of smaller than 30,000 to thereby form a binder resin for toner.

16. The method of manufacturing a binder resin for toner as claimed in claim 15, wherein said forming said binder resin for toner further comprises:

producing a resin mixture having said hybrid resin and said amorphous resin (Z) mixed in a solvent capable of dissolving said amorphous resin (Z); and removing said solvent from said resin mixture.

* * * * *